(12) United States Patent
Larsson

(10) Patent No.: US 8,644,870 B2
(45) Date of Patent: Feb. 4, 2014

(54) SUM-RATE BALANCING IN WIRELESS MULTICELL AND MULTICARRIER SYSTEM

(75) Inventor: Peter Larsson, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 237 days.

(21) Appl. No.: 13/132,110

(22) PCT Filed: Nov. 30, 2009

(86) PCT No.: PCT/IB2009/007596
§ 371 (c)(1),
(2), (4) Date: Jun. 1, 2011

(87) PCT Pub. No.: WO2010/064110
PCT Pub. Date: Jun. 10, 2010

(65) Prior Publication Data
US 2012/0028667 A1    Feb. 2, 2012

Related U.S. Application Data

(60) Provisional application No. 61/116,771, filed on Nov. 21, 2008.

(51) Int. Cl.
*H04B 7/00* (2006.01)
(52) U.S. Cl.
USPC .......................................................... 455/509

(58) Field of Classification Search
USPC ........... 455/509, 226.1, 243.1, 423, 501, 522; 370/203, 329; 375/260
See application file for complete search history.

(56) References Cited

U.S. PATENT DOCUMENTS

| 6,400,773 B1 | 6/2002 | Krongold et al. |
| 2006/0067417 A1* | 3/2006 | Park et al. ..................... 375/260 |
| 2007/0184853 A1 | 8/2007 | Hottinen et al. |
| 2008/0260003 A1 | 10/2008 | Baudais |
| 2009/0197632 A1* | 8/2009 | Ghosh et al. .................. 455/522 |

FOREIGN PATENT DOCUMENTS

WO    WO 02/100008 A1    12/2002

* cited by examiner

*Primary Examiner* — Shaima Q Aminzay

(57) ABSTRACT

A method in a communication node of a wireless communications system that provides at least two communication links each having at least two frequency channels. The communication node is configured to communicate with a receiving communication node over a link under influence of interference from surrounding transmitter(s) using said frequency channels. The method includes determining a target for said link for the sum of the data rates and allocating power on the frequency channels to reach said target while minimizing the sum of the power on said link.

12 Claims, 13 Drawing Sheets

US 8,644,870 B2

SUM-RATE BALANCING IN WIRELESS MULTICELL AND MULTICARRIER SYSTEM

This application claims the benefit of U.S. Provisional Application No. 61/116,771, filed Dec. 1, 2008, the disclosure of which is fully incorporated herein by reference.

TECHNICAL FIELD

The present invention relates to a method and arrangement for allocating power in a wireless communication system exposed to interference from multiple cells. In particular, it enables power allocation balanced over multiple carriers and multiple channels, thereby also selecting channels.

BACKGROUND

To ensure a desired communication quality in a wireless communication system, power and rate control are often deployed. One type of power and rate control aims to ensure that a certain fixed rate is achieved for each user by adjusting the Carrier-to-Interference-Noise-Ratio (CINR) to a per user CINR target (or to an equal CINR target for all users). This approach is denoted CINR balancing (sometimes the N is dropped and it is referred to as CIR balancing). Note that the term user will interchangeably be used with the terms link and TX-RX pair.

A number of distributed CINR balancing schemes has been developed. In S. A. Grandhi, R. Vijayan, and D. J. Goodman, "Distributed power control in cellular radio systems," IEEE Trans. Commun., pt. 1, vol. 42, no. 2-4, pp. 226-228, 1994, the Distributed Power Control (DPC) algorithm was introduced. Based on the $m^{th}$ iteration power value $P_u^{(m)}$, CINR $\Gamma_u^{(m)}$ and target CINR $\Gamma_u^{Target}$ for a link u, a new power value for link u may be calculated as $$P_u^{(m+1)} = P_u^{(m)} \frac{\Gamma_u^{Target}}{\Gamma_u^{(m)}} \quad (1)$$

An intuitive rational for the form of (1) is by noticing that for the CINR, if all interference is kept constant, the CINR is linear in the transmit power of the own link. Hence, if it is desired to increase the CINR with some factor, the power need to be increased with the ratio between the desired CINR and the current CINR.

The CINR balancing idea was developed for voice services in narrowband systems.

However, today's systems are often of broadband type. In order to handle the wider bandwidth, the wider band is typically divided into multiple smaller bands on which information is transferred over. A typical scenario where this applies is OFDMA (Orthogonal Frequency Division Multiplex access).

Another scenario could be the use of multiple bands, possible even residing in widely distant parts of the spectrum, in cognitive radio systems.

While CINR balancing could be used on each spectrum resource, such as a subcarrier, it does not account for or exploit that different spectrum resources often fades independently and that it would be wiser to reallocate power to subcarriers with a good gain to noise ratio rather than poor ones.

In the case of cognitive radio (or any other system) using bands on significantly different frequency bands, the mean path loss and interference situation of each band may also differ significantly, and it may make sense to reallocate power to bands where it best pays off, e.g., in terms of data rate.

SUMMARY

Hence, it is desired to achieve a method and arrangement for power and rate control that incorporates the aspect of multiple frequency bands and/or subcarriers. According to the embodiments of the present invention, this achieved by providing a certain sum-rate for one link to each user, i.e. the rate offered when summed over all subcarriers/frequency bands on said link.

According to a first aspect of the present invention a method in a communication node of a wireless communications system is provided. The wireless communications system is providing at least two communication links each having at least two frequency channels, wherein the communication node is configured to communicate with a receiving communication node over a link under influence of interference from surrounding transmitter(s) using said frequency channels. In the method, it is determined a target for said link for the sum of the data rates, and power on the frequency channels is allocated to reach said target while minimizing the sum of the power on said link.

According to a second aspect of the present invention, a communication node of a wireless communications system is provided. The wireless communication system is providing at least two communication links each having at least two frequency channels. The communication node is configured to communicate with a receiving communication node over a link under influence of interference from surrounding transmitter(s) using said frequency channels. Furthermore, the communication node comprises a processor configured to determine a target for said link for the sum of the data rates, and a power allocator configured to allocate power on the frequency channels to reach said target while minimizing the sum of the power on the link.

According to a third aspect of the present invention, a method in a communication node of a wireless communications system is provided. The communication node is subject to influence of interference from surrounding transmitter(s) and the wireless communication system is providing at least two communication links each having at least two frequency channels, wherein each link is defined to comprise a sender in communication with a receiver using said frequency channels. In the method, data or pilot signals are received on the frequency channels from a sending node, an indication is determined based on the GINRs of the frequency channels from the received data or pilot signals, and the determined indication is sent to the sending node. This indication is to be used at the sending node for allocating power on the frequency channels to reach a target for a link for the sum of the data rates while minimizing the sum of the power on the link.

According to a fourth aspect of the present invention, a communication node of a wireless communications system is provided. The communication node is subject to influence of interference from surrounding transmitter(s) and the wireless communication system is providing at least two communication links each having at least two frequency channels, wherein each link is defined to comprise a sender in communication with a receiver using said frequency channels. The node comprises a receiver operable to receive data or pilot signals on the frequency channels from a sending node, a processor for determining an indication based on the GINRs of the frequency channels from the received data or pilot signals, and a transmitter for sending the determined indication to the sending node to be used at the sending node for allocating power on the frequency channels to reach a target for a link for the sum of the data rates while minimizing the sum of the power on the link.

Thus an advantage with embodiments of the present invention is that the TX-RX pairs (links) adjust their powers to meet a target sum-rate.

A yet further advantage with the embodiments of the present invention is that power is allocated to the best subcarriers (or frequency bands), i.e. not wasted on poor subcarriers (or frequency bands). This, with the minimum sum-power objective, translates into energy efficiency, reduced $CO_2$ footprint, and extended battery time.

DETAILED DESCRIPTION

Figures 1A, 1B:
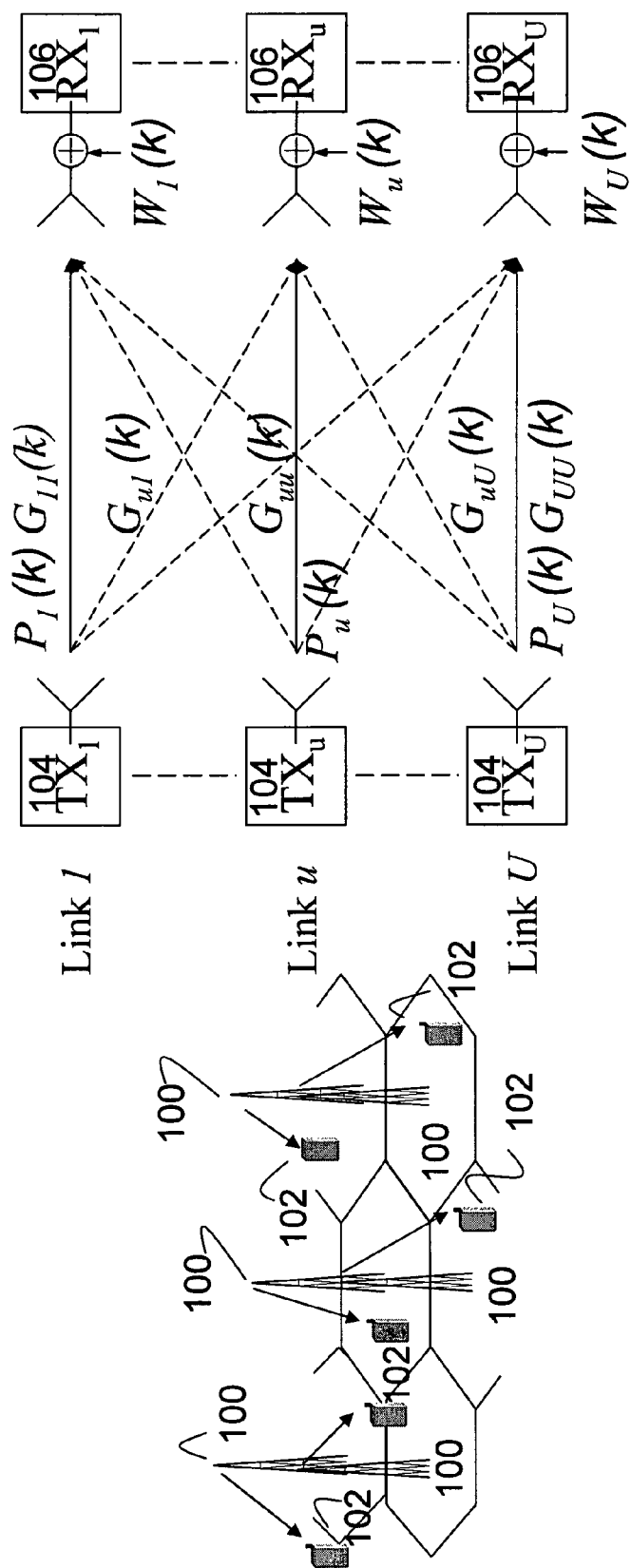
FIGS. 1a, 1b and 1c illustrate a wireless communication system wherein the present invention may be implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

FIGS. 1a and 1b illustrate a wireless communication system wherein the embodiments of the present invention may be implemented. In this scenario, the base station is the sending unit and the mobile terminal is the receiving unit. However, the embodiments of the present invention are also applicable when the mobile terminal is the sending unit and the base station is the receiving unit. The wireless communication system here exemplified by a cellular system, such as a LTE (Long Term Evolution) system, comprises radio base stations 100 referred to as eNode Bs which are connected to a core network (not shown) and the sNodeBs may also be interconnected. Each eNode B 101 has a transceiver 104 associated with an antenna 105 and the eNode Bs communicate wirelessly with mobile terminals 102 comprising a transceiver 106 and an antenna 107. The present invention is directed to a communication node having a sending unit in a wireless communication system. Although it is a sending unit, it comprises both a transmitter and receiver. The sending refers to the direction of sending of data. The receiver of the sending node receives control information such as measurement information.

FIG. 1b illustrates U links, i.e. U senders TX and U receivers RX. Each link has k channels (frequency bands/subcarriers) and each channel is transmitted with a power $P_u(k)$ with the propagation path gain $G_{uu}(k)$. Further, the receivers are subject to interference from transmitters not belonging to the same link having the propagation path gain $G_{uj}(k)$, (with $j \neq u$). In addition, the receivers are subject to internal and external noise $W_u$.

It should be noted that although that the primarily considered network topology is a cellular system, the present invention is not limited hereto. In fact, the present invention may be applied to any wireless multicarrier/band system where multiple concurrent and potentially interfering transmissions occur.

The present invention concerns power allocation for a multi-carrier system. Hence, in embodiments of the present invention the powers used on the different spectrum resources/bands/subcarriers are adjusted such that each user meets a target sum-rate, i.e. the sum of the rates over the available channels on one or more links (carriers). Hence, this target sum-rate may be link specific or similar for subsets or all links. In this way, a power and rate control is achieved that incorporates the aspect of multiple bands and/or subcarriers.

Figure 1C:
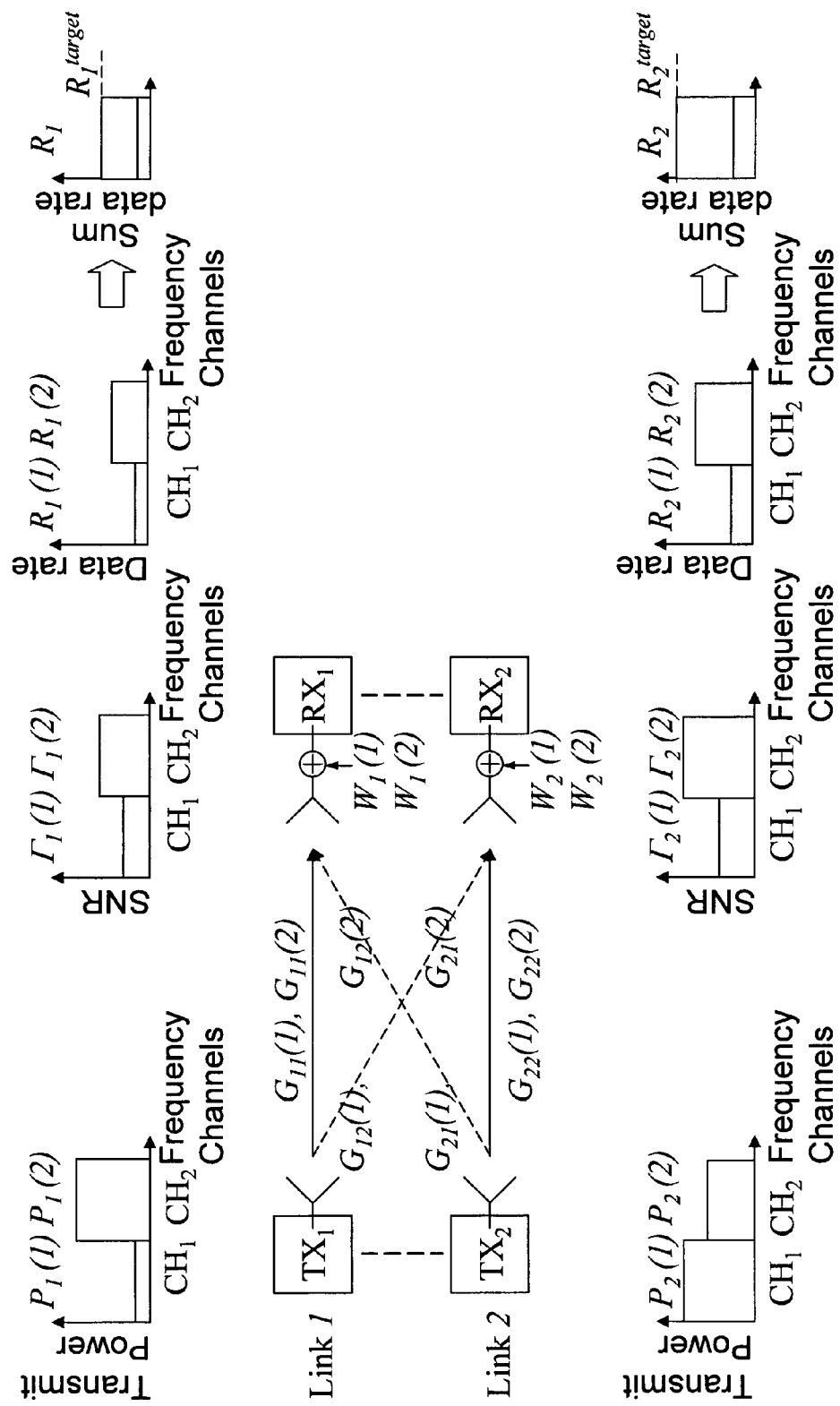

This is illustrated in FIG. 1c. FIG. 1c illustrates a system 120 comprising 2 links, i.e. 2 senders TX and 2 receivers RX. Each link has 2 channels (bands/subcarriers) and each channel is transmitted with a power $P_u(k)$ with the gain $G_{uu}(k)$. Further, the receivers are subject to interference from senders to receiver u, having propagation path gain $G_{uj}(k)$, (with $j \neq u$) from transmitters not belonging to the same link. In addition, the receivers are subject to internal and external noise $W_u(k)$.

Link 1 uses transmit power $P_1(1)$ on channel 1, CH1, and $P_1(2)$ on channel 2, CH2, as denoted in graph 130. The CINR on CH1 of link 1 is $\Gamma_1(1)$ and the CINR on CH2 of link 1 is $\Gamma_1(2)$ and the data rate on CH 1 of link 1 is $R_1(1)$ and the data rate on CH 2 of link 1 is $R_1(2)$ as shown in the graphs denoted 140 and 150 respectively. The sum of the data rates over the channels 1 and 2 is then determined as illustrated in the graph denoted 160 according to embodiments of the present invention. The corresponding parameters for link 2 is illustrated in the graphs denoted 170-200.

Figure 2:
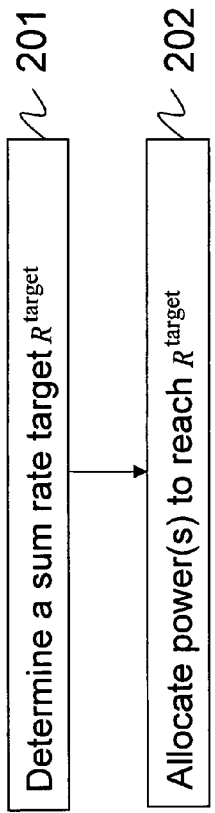
FIG. 2 is a flowchart of the method according to an embodiment of the present invention.
Figure 2:
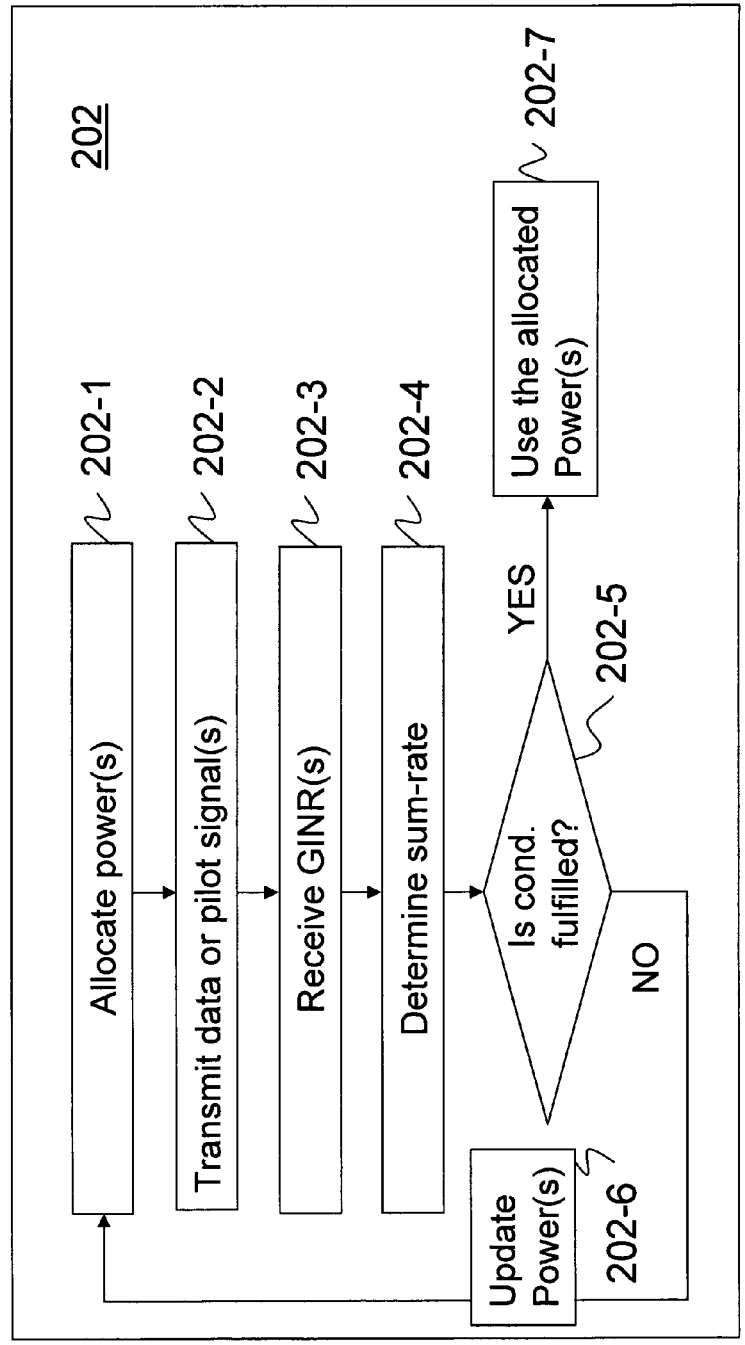

Furthermore, a method in a communication node of a wireless communications system is provided wherein the communication node communicates wirelessly with a receiving node which is subject to influence of interference from surrounding transmitters. The wireless communication system is providing at least two communication links each having at least two frequency channels, wherein each link is defined to comprise a sender in communication with a receiver using said frequency channels. As illustrated in the flowchart of FIG. 2, where:

201. A processor determines a target for a link for the sum of the data rates.

202. A transmit power allocator allocates power on the frequency channels to reach said target while minimizing the sum of the power on the link.

According to one embodiment, the link sum-power is minimized by an iterative and distributed solution while a desired link sum-rate for each TX-RX pair is targeted. By minimizing the link sum-power, each user will opportunistically allocate most power to the good channels compared to the bad channels and the bad channels may even be unallocated with zero power. A good channel is a channel with high gain to noise ratio and a bad channel is a channel with low gain-to-interference-noise-ratio (GINR). Carriers with low gain-to-interference-noise-ratio may not be allocated any power and are equivalent to being unscheduled. Instead of solving a combinatorially very complex problem, which is the classical approach to the channel allocation problem, we find the optimal channel allocation in merely a few iterations.

Hence, the allocation step 202 comprises according to one embodiment the further steps of:

The power allocator allocates 202-1 power on each frequency channel on said link. A transmitter transmits 202-2 data or reference signals on the at least two links using the frequency channels of the links to a receiving node and a receiver is receiving 202-3 an indication based on the Gain-to-Interference-ratios (GINRs) of the frequency channels from the receiving node based on the transmitted data or reference signals. Further, a calculator determines 202-4 the sum of the data rate based on the received GINRs of the frequency channels and whether said target is fulfilled or a convergence metric is met 202-5. These steps are repeated until said target is fulfilled or if said convergence metric is met. For each iteration the allocated power is updated 202-6 such that the target or the convergence metric can be fulfilled in a few iterations. Hence, when the target or the convergence metric can be fulfilled the allocated power is used for transmission 202-7. This will be further explained below.

The algorithm may also be used together with other power and rate objectives, algorithm and means. It may for example be used to ensure that another power and rate control method does not exceed an upper sum-rate limit per user. This can be achieved by down-controlling the transmit power determined by the proposed algorithm to a power level such that the per user sum-rate limit is not exceeded.

Turn now to FIGS. 1b and 1c to further explain embodiments of the present invention, where a cellular system with transmitting base stations and receiving mobiles are considered. Naturally, the embodiments of the present invention are also applicable on uplink transmissions from the user equipment to the base station. In FIG. 1b, a model for the system of FIG. 1a is shown. Sender u (in this case the base station u) transmits with power $P_u(k)$ on channel k, over channels $G_{uu}(k)$ to receiver u (in this case user equipment u). Sender u's transmission causes interferences at user j via the channel gain $G_{ju}(k)$.

The operation will be described from a distributed operation perspective. Nevertheless, if the full gain matrix is known at each sender, or a central node, the same principles can be applied to calculate the power, rates, and channel allocations as depicted below.

Figure 3:
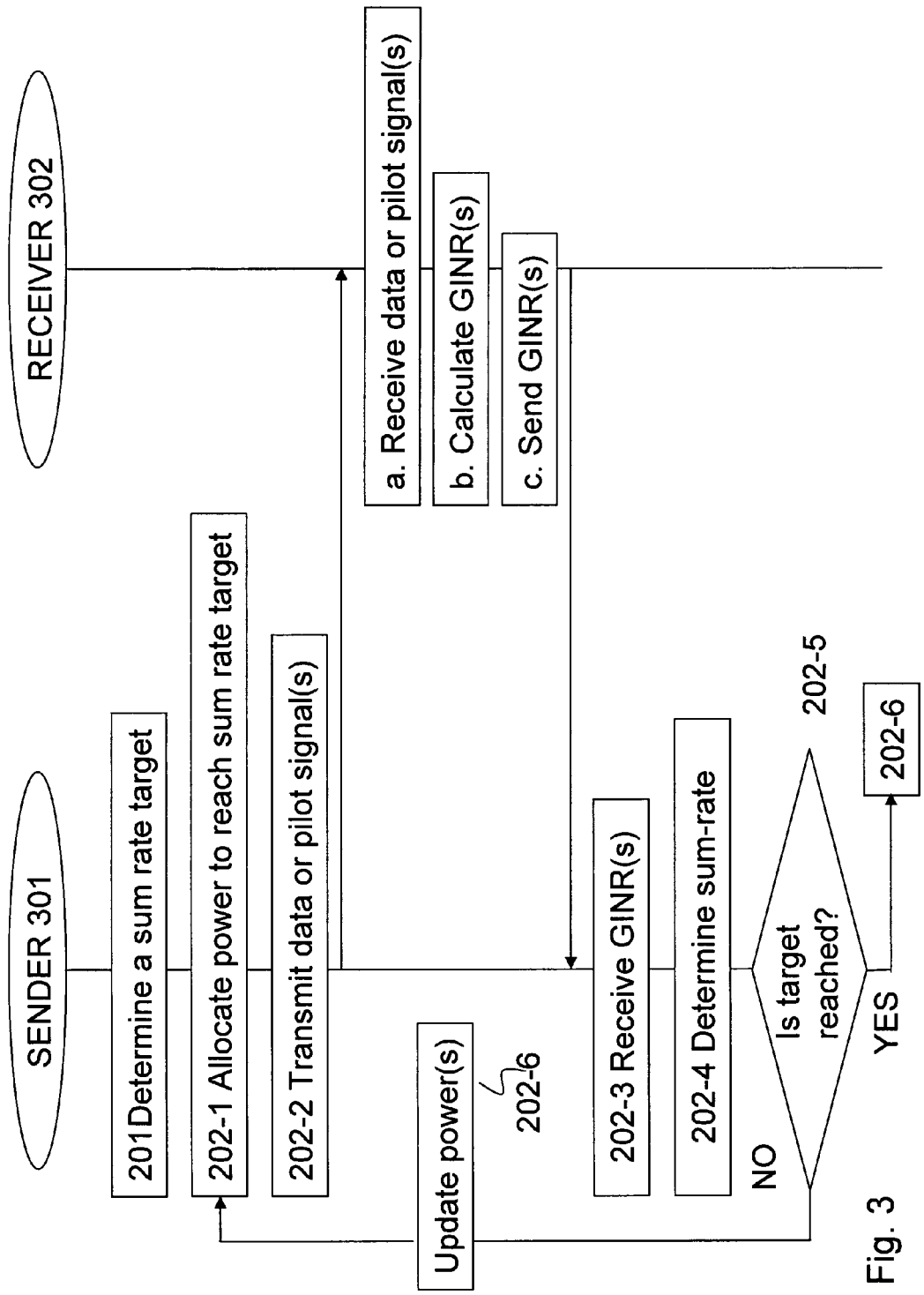
FIG. 3 is a sequence diagram of the method according to an embodiment of the present invention.

The method according to one embodiment is illustrated in the sequence diagram of FIG. 3, with a sender 301 and a receiver 302 perspective. It should be noted that the sender 301 and receiver 302 refers to the direction for transmission of data, since the sender 301 will also receive control information sent from the receiver 302. According to one alternative, the sender 301 is a base station and the receiver 302 is a mobile terminal and according to another alternative, the sender 301 is a mobile terminal and the receiver 302 is a base station.

In a first step 201 the sender determines or is informed about a sum data rate target. In a second step 202-1, power is allocated to reach the determined sum target data rate or gets closer to the desired sum-rate. In order to be able to obtain GINR parameters for the channels/band/subcarriers, data or pilot signals are transmitted 202-2 with the allocated power to the receiver. The reason that pilot signals may be needed, is that data should only be sent on carriers that have a non-zero power, and it may be required to determine the other silent channels' propagation path gain to reallocate power to those channels when their channel quality increases.

The data or pilot signals are received at step a, FIG. 4, at a receiving module at the receiver accordingly.

In addition, the sender may also, on occasion, send pilots (a.k.a. pilot signals, references symbols, channel estimation symbols, training sequences) with for the receiver known power on each channel such that the receiver may determine its own sender-to-receiver channel gains. In addition to this, the receiver also estimates the total interference plus noise on each channel.

Based on the gain and the total interference plus noise on each channel, a calculator of the receiver 302 is operable to form (step b. FIG. 4) GINRs or another parameter, such as the SINR, from which the GINR can be derived from, and the receiver 302 comprises a transmitter for sending (step c. FIG. 4) all or a selected subset of those back to the sender 301.

The sender receives 202-3 the GINR(s) at a receiver and uses the GINRs to calculate 202-4 the sum data rate and determine 202-5 if the sum data rate target is reached or if a convergence metric is met. If the sum data rate is reached, then the allocated power is used for data transmission, else the power to be allocated is updated 202-6 according to an algorithm as described in detail below.

This procedure is repeated until a convergence metric is met. The convergence metric may be that the deviation of the relative error of the actual sum-rate to the target sum-rate is less than a factor E. Alternatively, the convergence metric may be that each or the sum relative power updates from one to the next iteration is smaller than some threshold. Alternative convergence measures can be envisioned, such as based on channel rate iteration updates.

While GINRs are used in the feedback in the example above, other but equivalent, feedback measures could also be considered. It is also possible to send back the received pilot power to the sender, as the sender, based on knowledge of used pilot power, can calculate the own channel gain. Another alternative is, to some extent, exploit measurements on received power for allocated and used channels for data traffic.

As stated above, FIGS. 2 and 3 show an iterative algorithm that provides a desired sum data rate while minimizing the sum-power for a link under the assumption of fixed interference. A reverse waterfilling based iterative algorithm is according to one embodiment used for this purpose. While this is not the only way to iteratively calculate the power and data rate allocations, given the optimization objective, it is a fast and always converging alternative.

In the following it is described how the power to be allocated is updated when using the reverse waterfilling allocation.

In the initialization phase, a Lagrange parameter $\lambda_u$ to be used for the waterfilling allocation may be set to a value which can be assumed to be as close as possible to the final Lagrange parameter as possible. If a $\lambda_u$, from a previous cell wide power update is available, this value may be used. Based on $\lambda_u$, and GINRs (in the first ever iteration round one may only have Gain-to-Noise-Ratios as interference have not yet been generated).

In this section, the first step to derive the corresponding ratio based iteration update equation to (1) is given.

Assume that all interference is fixed. Given a Lagrange parameter $\lambda_u$ for user u, the power per subcarrier is $$P_u(k) = \begin{cases} \lambda_u - \dfrac{W_u(k) + \sum_{\forall j \neq u} G_{uj}(k)P_j(k)}{G_{uu}(k)}, & \text{if} > 0 \\ 0, & \text{if} < 0, \end{cases} \quad (2)$$

with rate $R_u^{Target} = lg_2(1+\Gamma_u^{Target})$, $\Gamma_u^{Target} = C/I$, $C = P_u(k)$, $$I = \dfrac{W_u(k) + \sum_{\forall j \neq u} G_{uj}(k)P_j(k)}{G_{uu}(k)}.$$

The per user sum-rate is then calculated in step 202-4 as $$R_u = \sum_{\forall k} lg_2\left(1 + \dfrac{P_u(k)G_{uu}(k)}{W_u(k) + \sum_{\forall j \neq u} G_{uj}(k)P_j(k)}\right) \quad (3)$$

$$= \sum_{\forall k'} lg_2\left(\dfrac{\lambda_u G_{uu}(k)}{W_u(k) + \sum_{\forall j \neq u} G_{uj}(k)P_j(k)}\right),$$

where k' represent an index for the carriers with non-zero positive power. This may be rewritten to the following form $$2^{R_u} = \prod_{k'}\left(\dfrac{\lambda_u G_{uu}(k)}{W_u(k) + \sum_{\forall j \neq u} G_{uj}(k)P_j(k)}\right). \quad (4)$$

For the time being assume that at least one band/carrier is used. The number of active subcarriers/frequency band, $N_u$, is introduced such that (4) is $$2^{R_u} = \lambda_u^{N_u} \prod_{k'}\left(\dfrac{G_{uu}(k)}{W_u(k) + \sum_{\forall j \neq u} G_{uj}(k)P_j(k)}\right) = \lambda_u^{N_u} C_u, \quad (5)$$

where k' is an index for the $N_u$ active subcarriers, $c_u$ is constant if all interfering powers are assumed constant. N.B. this is the same assumption as done in deriving the iterative CIR balancing equation (1).

Assuming that $C_u$ and $N_u$ are the same from the iteration m to the next iteration m+1, the quotient between the $m^{th}$ and $m+1^{th}$ rate equations is formed according to $$\dfrac{2^{R_u^{(m)}}}{2^{R_u^{Target}}} = \left(\dfrac{\lambda_u^{(m)}}{\lambda_u^{(m+1)}}\right)^{N_u^{(m)}}. \quad (6)$$

It is seen that the identical (assumed fixed) interference terms $c_u$ are cancelled.

The updated Lagrange parameter is now solved for based on the previous Lagrange parameter, the previous measured rate, the previous number of active carriers, and the desired rate. This updated Lagrange parameter is used in step 202-6 when calculating the updated power to be allocated.

$$\lambda_u^{(m+1)} = \lambda_u^{(m)} \cdot 2^{\frac{R_u^{(m)} - R_u^{Target}}{N_u^{(m)}}} \quad (7)$$

In the above, it was assumed that at least one carrier per link was used. If no carrier is used, this is the case where $N_u^{(m)}=0$. This is an undesired situation, since user with no allocated power will not adjust their power to meet the sum rate. To mitigate this problem, the number of carriers is set to at least one according to $$N_u^{(m)} = \max\left(1, \sum_{\forall k}(P_u^{(m)}(k) > 0)\right). \quad (8)$$

To summarize, to find the desired power and data rate allocation, the following steps are performed.

An initial power is allocated (step 202-1) by using the initial values:

$$\lambda_u^{(0)} = \lambda_u^{Init}, N_u^{(0)} = N_u^{Init}, P_u^{(0)}(k) = P_u^{Init}(k) \quad (9)$$

The sum data rate is determined 202-4 as:

$$R_u^{(m)} = \sum_{\forall k} lg_2\left(1 + \dfrac{P_u^{(m)}(k)G_{uu}^{(m)}(k)}{W_u^{(m)}(k) + \sum_{\forall j \neq u} G_{uj}^{(m)}(k)P_j^{(m)}(k)}\right). \quad (10)$$

Provided that the target is not reached, the updated power is determined by using the updated Lagrange parameter:

$$\lambda_u^{(m+1)} = \lambda_u^{(m)} \cdot 2^{\frac{R_u^{(m)} - R_u^{Target}}{N_u^{(m)}}} \quad (11)$$

Calculate the updated transmit power $$P_u^{(m+1)}(k) = \begin{cases} \lambda_u^{(m)} - \dfrac{W_u^{(m)}(k) + \sum_{\forall j \neq u} G_{uj}^{(m)}(k)P_j^{(m)}(k)}{G_{uu}^{(m)}(k)}, & \text{if} > 0 \\ 0, & \text{if} < 0 \end{cases} \quad (12)$$

Repeat until sufficient convergence achieved e.g. through $$\dfrac{R_u^{(m)} - R_u^{Target}}{R_u^{Target}} < \varepsilon_u \quad (13)$$

Figure 4A:
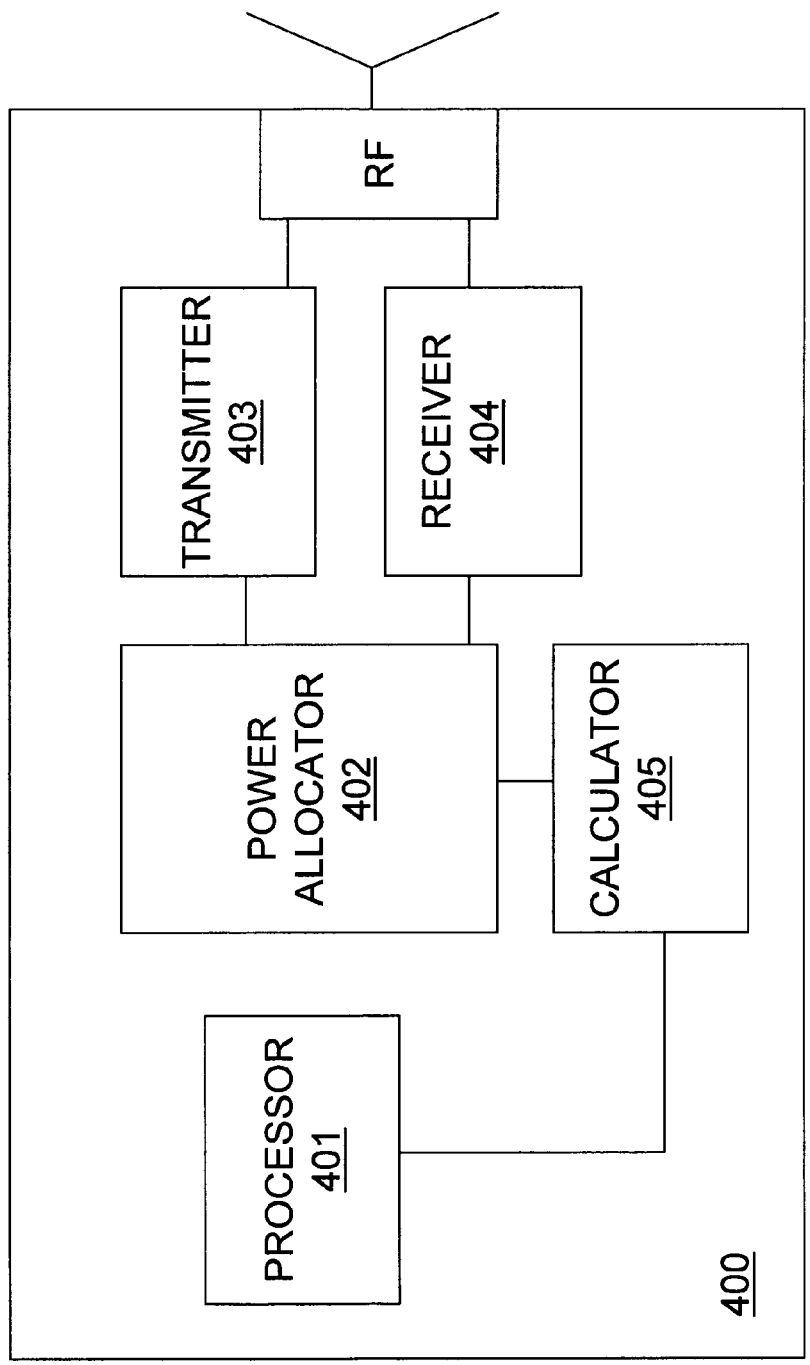
FIG. 4 schematically illustrate the communication nodes according to embodiments of the present invention.
Figure 4B:
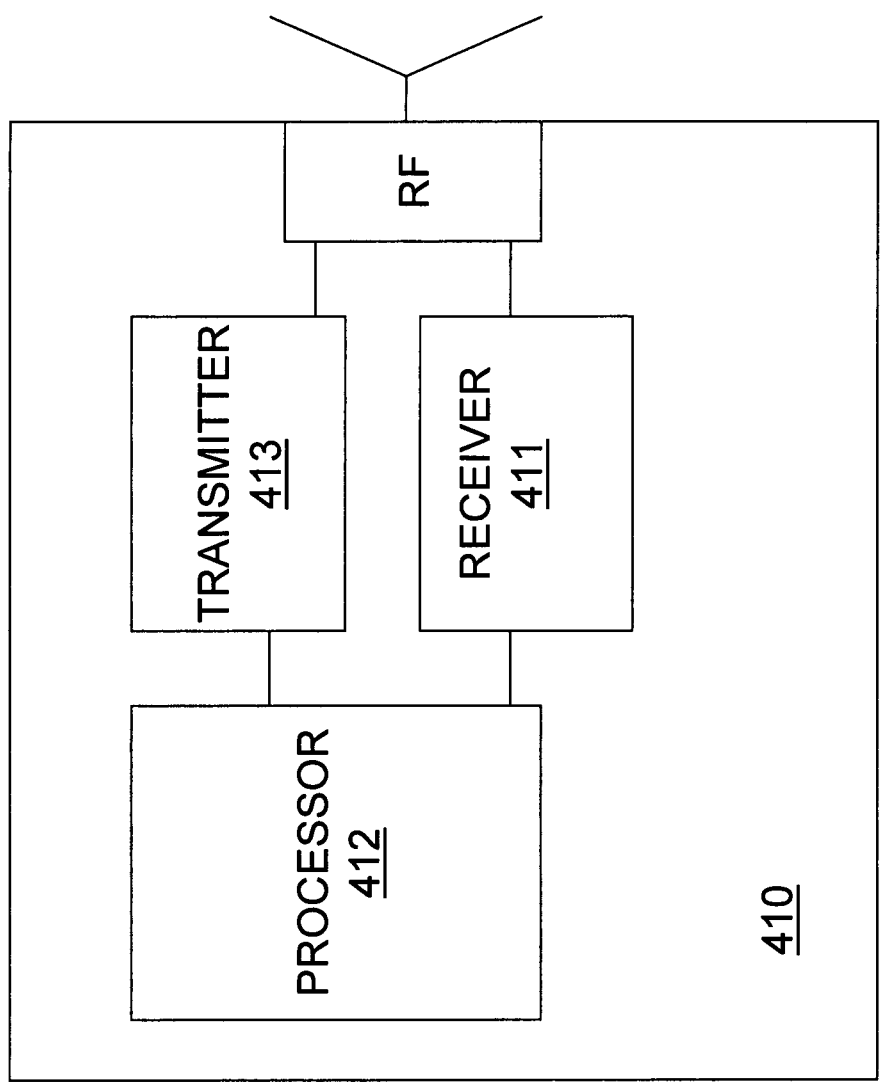

The method for allocating power as described above can be implemented in a sending communication node adapted for communication with a receiving node 410 as illustrated in FIGS. 4*a* and 4*b*. The sending node 400 is configured to be a part of a wireless communications system wherein the communication node is subject to influence of interference from surrounding transmitters. The sending node 400 may be base station or a mobile station. If the sending node 400 is a base station, the receiving node 410 is a mobile terminal and if the sending node 400 is a mobile terminal the receiving node 410 is a base station. The wireless communication system is providing at least two communication links each having at least two frequency channels and the communication node is configured to communicate with a receiving communication node over a link under influence of interference from surrounding transmitters using said frequency channels. It should be noted that the sending and the receiving nodes communicate over one link providing at least two frequency channels. The sending node 400 comprises a processor 401 configured to determine a target for a link for the sum of the data rates, and a power allocator 402 configured to allocate power on the frequency channels to reach said target while minimizing the sum of the power on the link.

According to embodiments of the present invention, the sending node comprises a transmitter 403 for transmitting data or reference signals on the at least two links using the frequency channels of the links to a receiver 411 of the receiving node 410. The receiving node 410 comprises a processor 412 configured to use the data or pilot signals to estimate the GINRs and a transmitter for sending the estimated GINRs or similar parameter to the sending node 400. Hence the sending node 400 further comprises a receiver 404 for receiving an indication of the GINR of the frequency channels of the at least two links. Further, a calculator 405 is provided at the sending node 400 which is configured to determine the sum of the data rate on the link based on the received GINRs of the frequency channels. The calculator 405 is further configured to determine if said target is fulfilled, and to control that the allocation of the power is repeated using an updated power until said target is fulfilled.

A waterfilling algorithm may be used for allocating the power. Therefore, the calculator 405 is according to one embodiment further configured to calculate the updated power to be allocated on one link, u, for a channel by using waterfilling (m+t) allocation provided a predefined Lagrange parameter $\lambda_u^{(m+1)}$, where u represents the link and m the iteration. The updated Lagrange parameter to be used for calculating the updated power to be allocated for link u, $\lambda_u^{(m+1)}$ may be calculated as $$\lambda_u^{(m+1)} = \lambda_u^{(m)} \cdot 2^{\frac{R_u^{(m)} - R_u^{Target}}{N_u^{(m)}}},$$

wherein R represents the data rate on link u at iteration m and $R_u^{Target}$ is said target and $R_u^{(m)}$ is the number of frequency channels for which the sender use non-zero transmit power in iteration m.

The performance of the embodiments of the present invention will be illustrated by the simulation results disclosed below.

In this section a 100 cell system (arranged as a 10×10 hexagonal cells with wrap around is considered. The mean path gain model, for channel k is $\overline{G}_{ij}(k) \propto R_{ij}^{-\alpha}(k)$, where $R_{ij}$ is the distance between sender for link i and receiver for link j. The instantaneous path gain is based on the mean path gain $\overline{G}_{ij}(k)$ and the fading gain $g_{ij}(k)$, giving $G_{ij}(k) = g_{ij}(k) \cdot \overline{G}_{ij}(k)$. For the desired link, i=j, whereas for the interfering links i≠j. (Note that even if the mean path gain is equal among channels for a user, each channel for a link may fade differently and have different instantaneous path gains.) In the simulations below, α=3.6 is assumed.

In the following simulation, it is further assumed that sum-rate target per user is 2 b/Hz/s, i.e. $R_u^{Target}$=2b/Hz/s.

Figure 5:
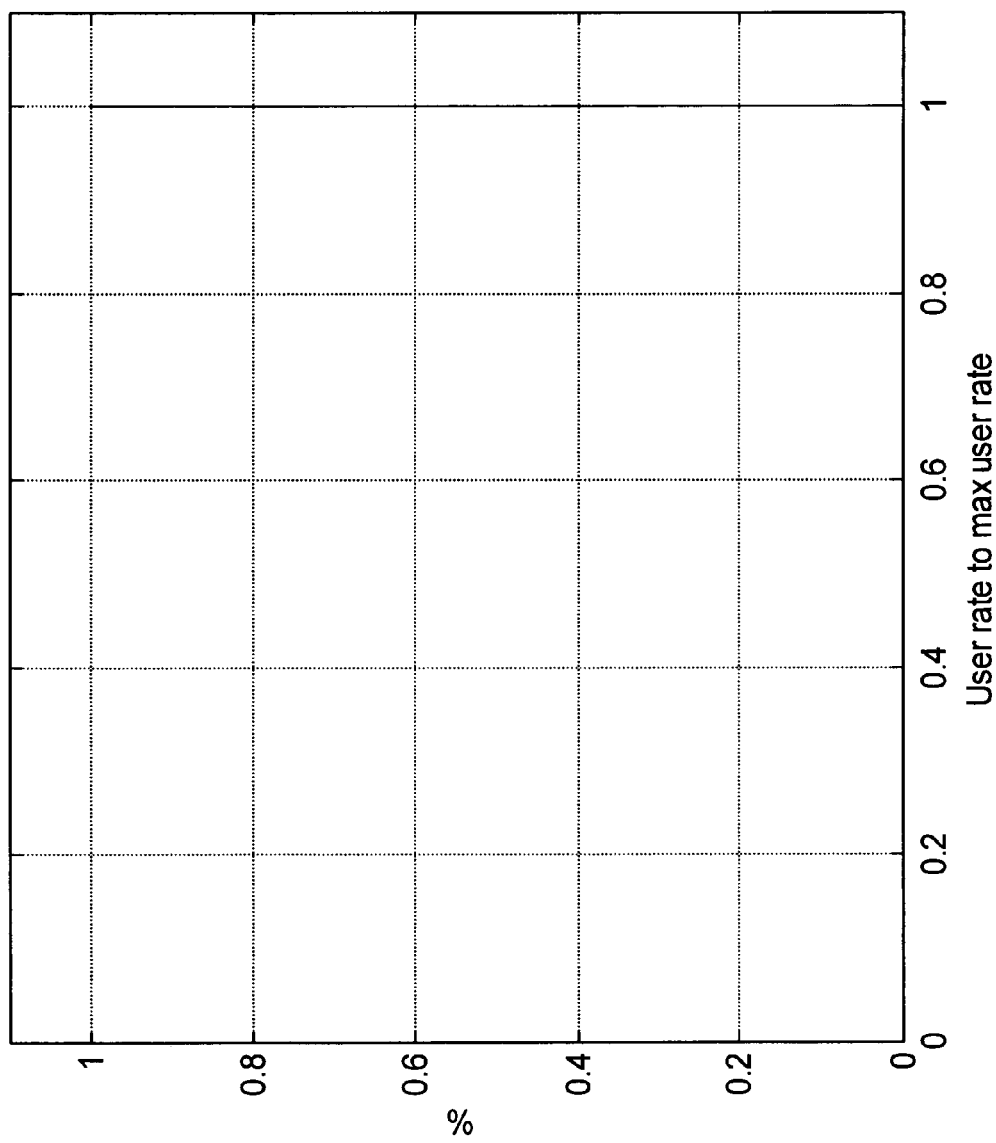
FIG. 5 shows the link sum-rate to max sum-link rate CDF (Cumulative Distribution Function).

FIG. 5 shows the per user sum-rate CDF at the last iteration of the algorithm. It is evident that all users reach their sum-rate target.

Figure 6:
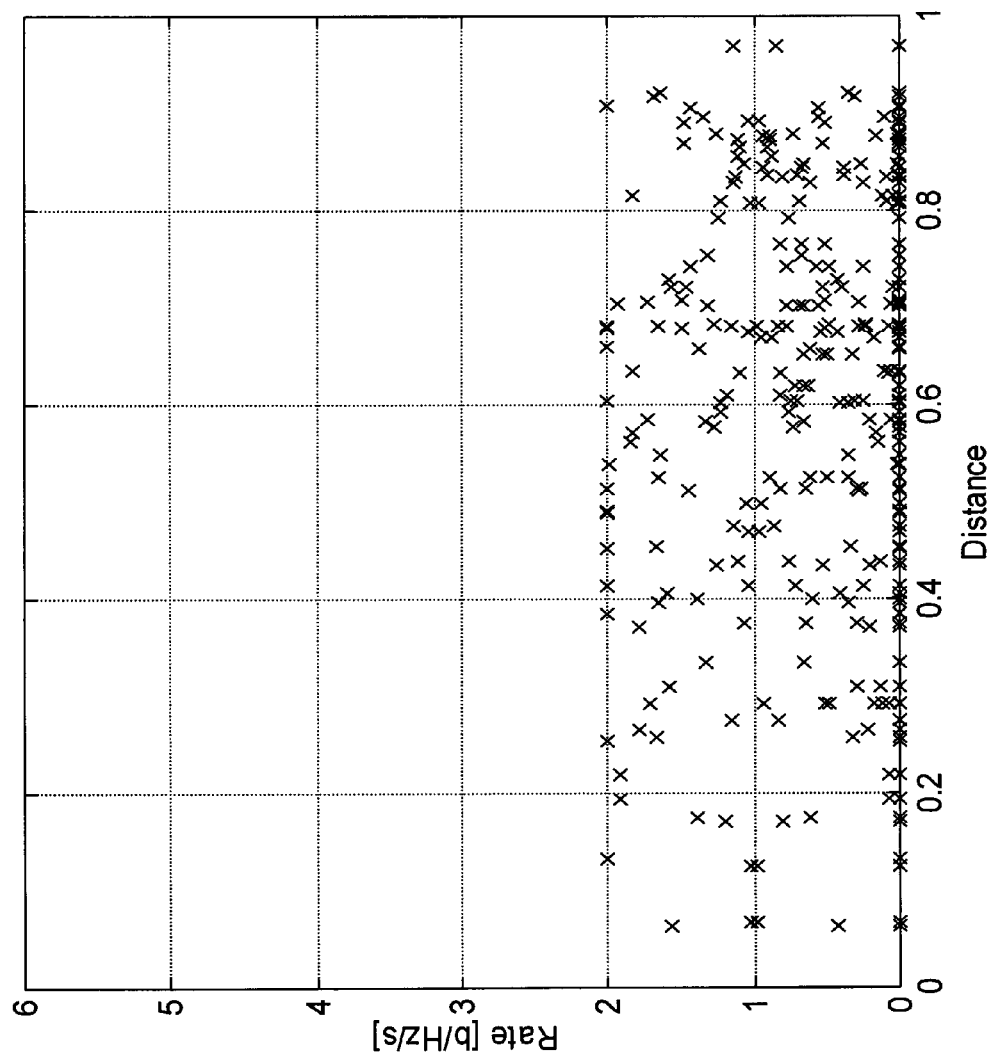
FIG. 6 shows per carrier and per user rate allocation versus basestation to mobile user distance.

FIG. 6 shows the per carrier rate allocation vs. distance between mobile user to base stations.

Figure 7:
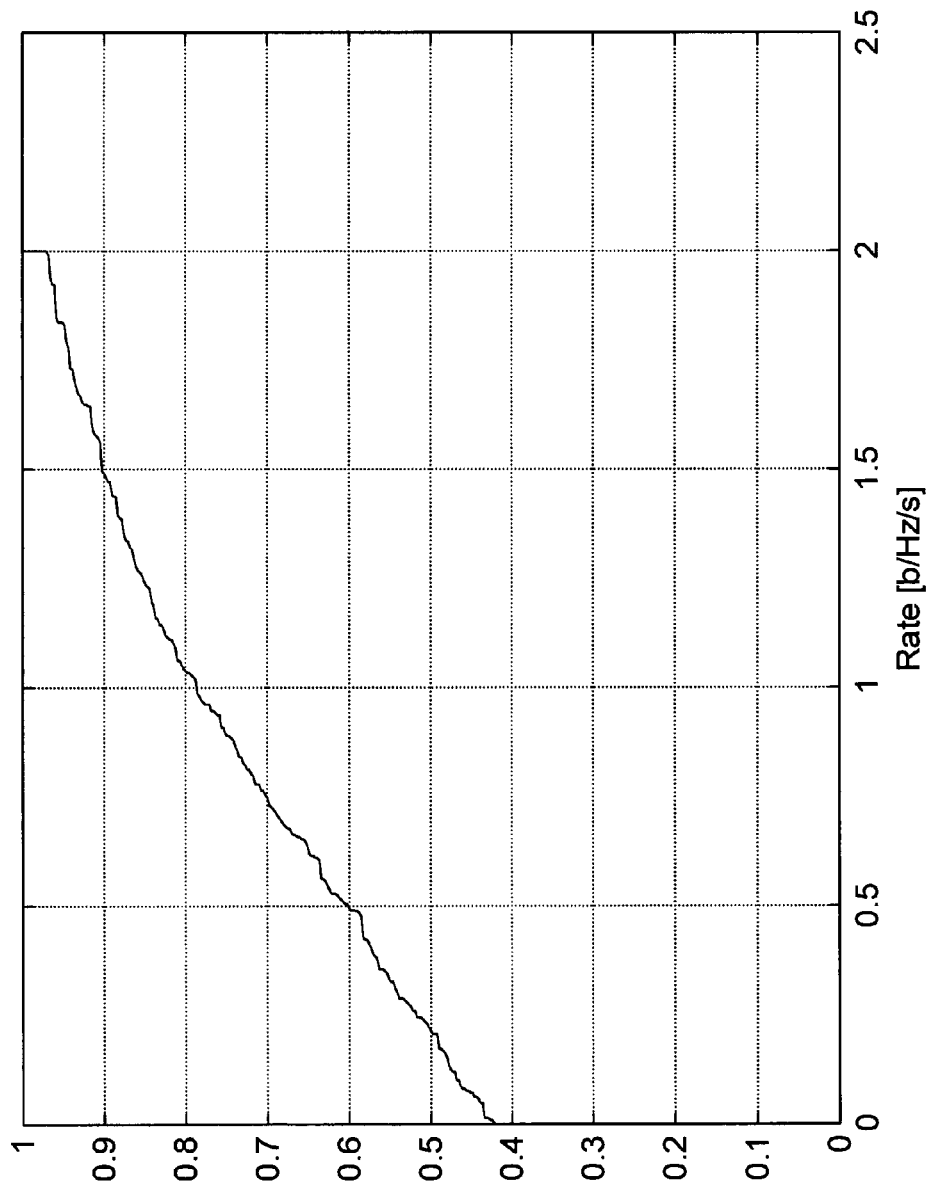
FIG. 7 shows per user and per carrier rate CDF.

FIG. 7 shows the rate CDF for all users and carriers at the last iteration of the algorithm. It is observed that only a small fraction on links 3% uses a link rate equal to the maximum sum-rate (meaning that the other 3 carriers for those users are entirely silent), about 42% of the subcarriers are silent, and the remaining 55% subcarriers are allocated a rate between zero on the maximum sum-rate.

Figure 8A:
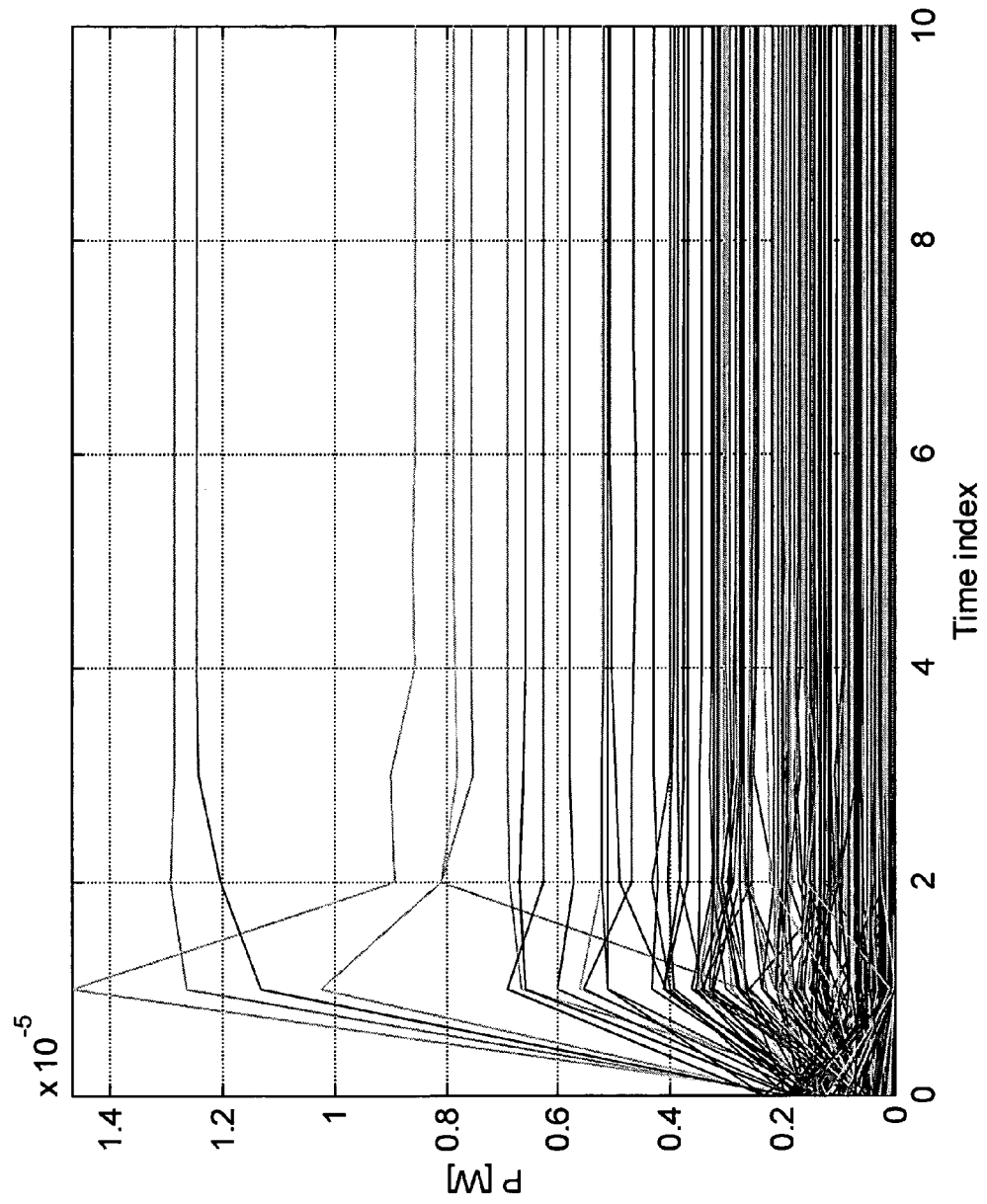
FIG. 8a-b show convergence characteristics per channel and user with different initialization conditions.
Figure 8B:
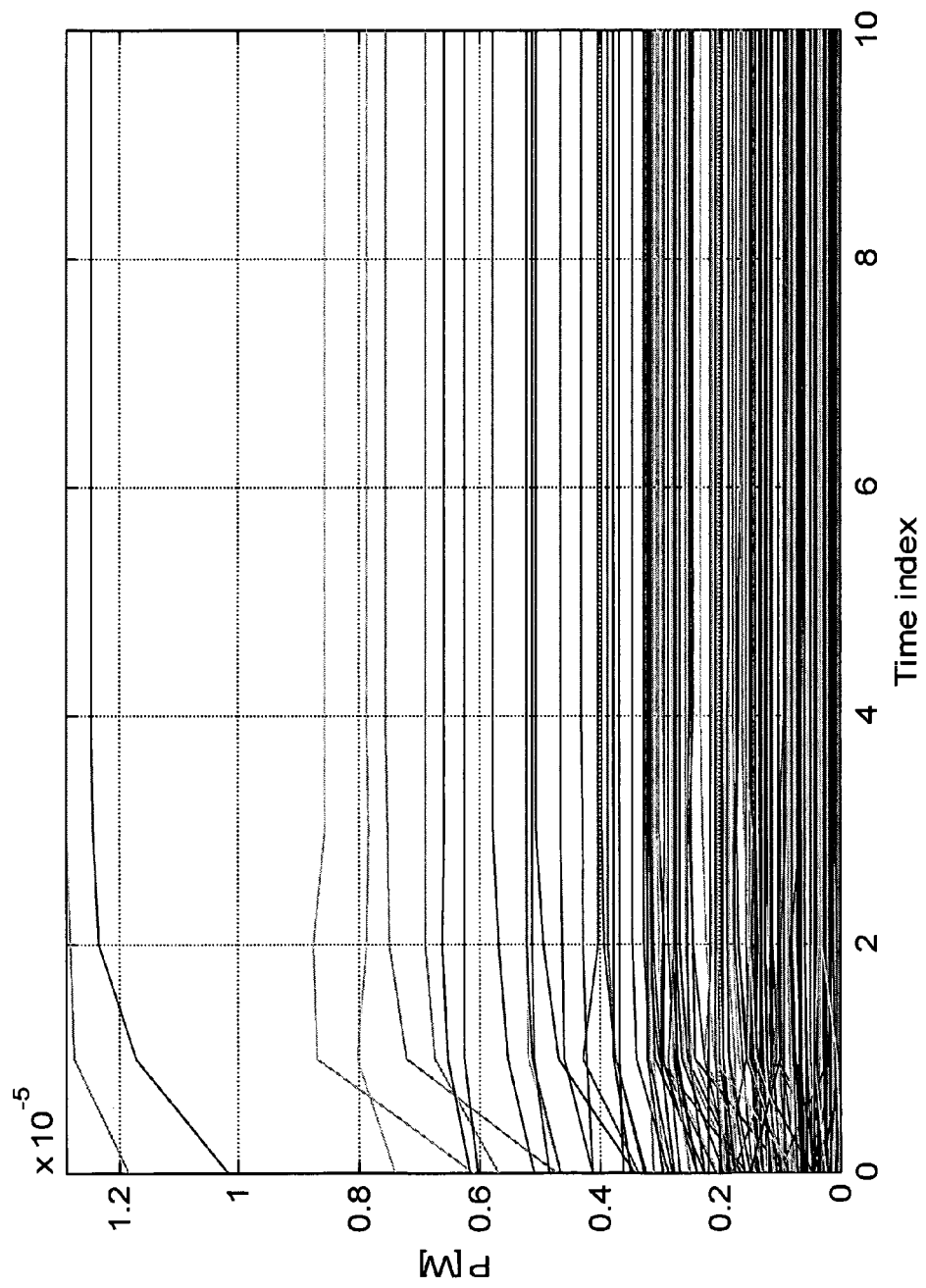
Figure 9A:
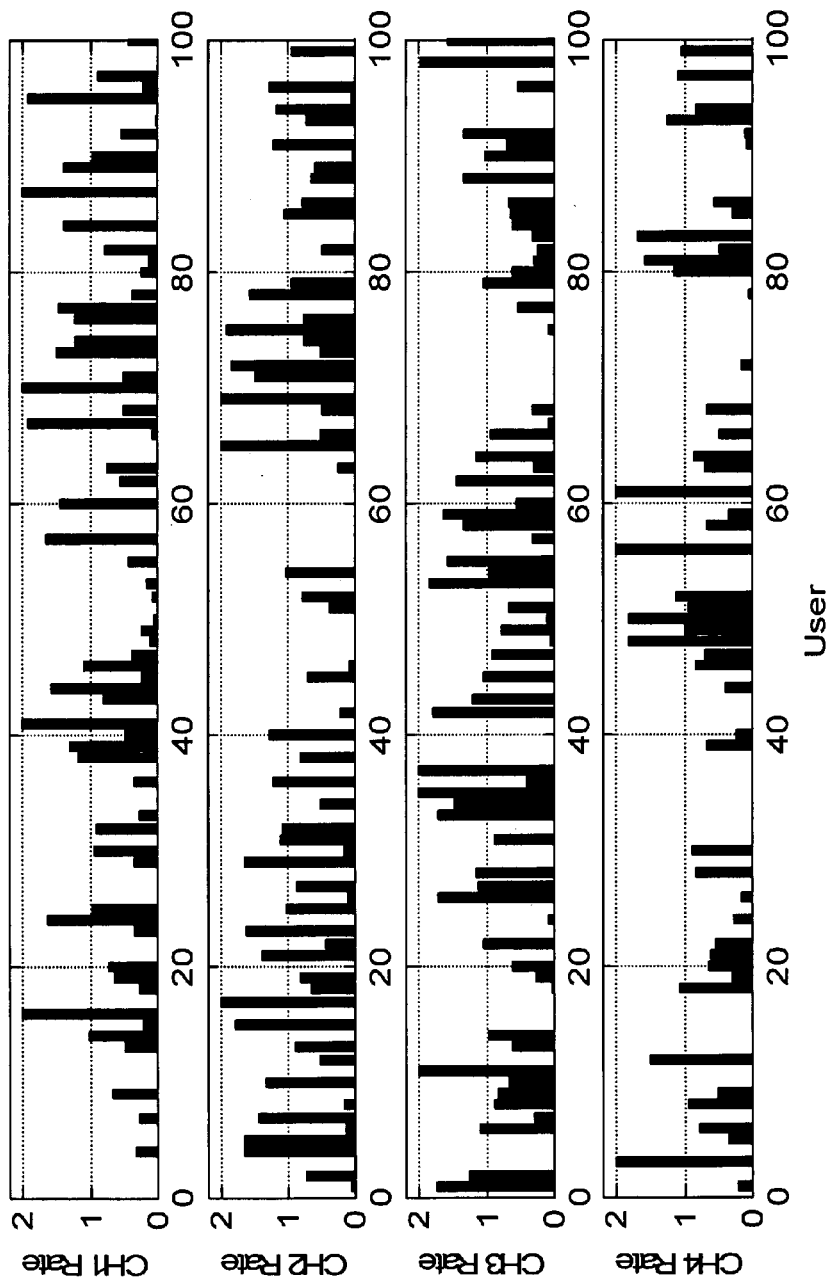
FIG. 9a-b show rate and channel allocation per user and per channel.
Figure 9B:
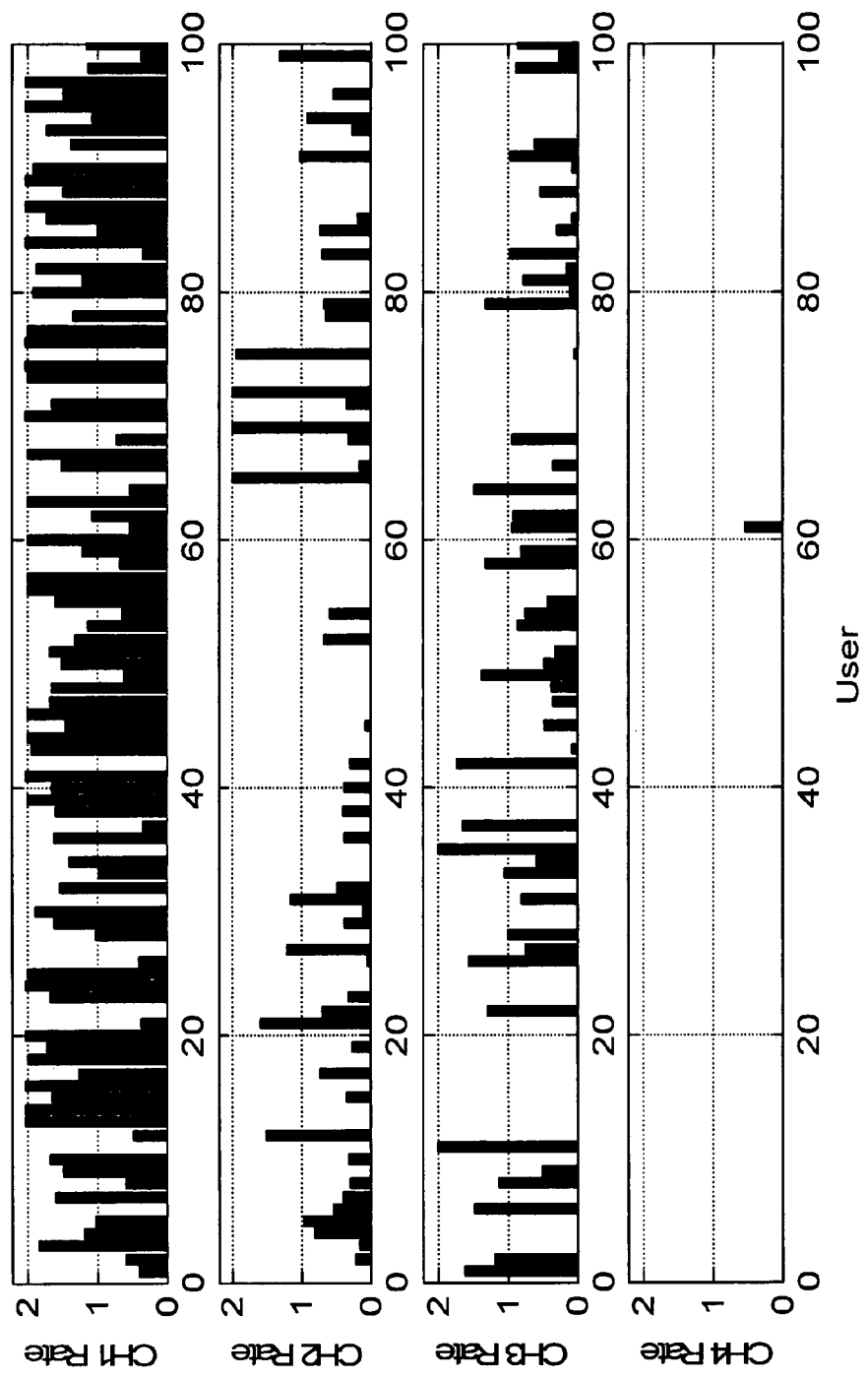

FIG. 8a-b shows the power variations (for every subcarrier and user) per iteration round when the updated powers are applied in the cellular system. FIG. 8a assumes a starting condition where all channels are assumed interference free and the mean path gain is used. FIG. 8b on the other hand assumes a starting condition where each user adapts their powers to meet their sum-rate targets where there is no interference. It seems that 3-4 iterations are more than enough for convergence in practice. A closer examination (not shown here) would show that the relative sum power error decreases with roughly 10 dB per iteration, i.e. a fairly fast convergence. FIGS. 9a-b illustrate the rate as well as the channel allocation (i.e. those channels with zero rate are unallocated and those with non-zero rate are allocated). FIGS. 9a-b illustrate 100 TX-RX pairs with 4 channels available for each. In FIG. 9a, the mean gain between a users channel are identical, but channels fade independently according to Rayleigh distributed variables. In FIG. 9b, the mean gain between a users channel are different, by a factor 1, 0.1, 0.1 and 0.01 respectively, and each channel also fade (Rayleigh) independently. Hence, FIG. 9b illustrates the case where different bands with significantly different mean path gain exists such in cognitive radio systems using widely separated bands.

The invention claimed is:

1. A method in a communication node of a wireless communications system providing at least two communication links each having at least two frequency channels, wherein the communication node is configured to communicate with a receiving communication node over a link under influence of interference from surrounding transmitter(s) using said frequency channels, the method comprises the steps of:
   determining a target for said link for the sum of the data rates; and
   allocating power on the frequency channels to reach said target while minimizing the sum of the power on said link;
   wherein the updated power to be allocated on one link, u, for a frequency channel is calculated by using waterfilling allocation provided a predefined Lagrange parameter $\lambda_u^{(m+1)}$, where u represents the link and m the iteration, and
   wherein an updated Lagrange parameter to be used for calculating the updated power to be allocated for link u, $\lambda_u^{(m+1)}$, is $$\lambda_u^{(m+1)} = \lambda_u^{(m)} \cdot 2^{\frac{R_u^{(m)} - R_u^{Target}}{N_u^{(m)}}},$$

wherein $R_u^{(m)}$ represents the data rate on link u at iteration m, $R_u^{Target}$ is said target, and $N_u^{(m)}$ is the number of frequency channels for which the sender use non-zero transmit power in iteration m.

2. The method according to claim 1, wherein the allocating step further comprises the steps of:
- allocating power on each frequency channel on said link,
- transmitting data or reference signals on the at least two links using the frequency channels of the links to the receiving communication node,
- receiving an indication based on Gain-to-Interference-ratios (GINRs) of the frequency channels from the receiving communication node based on the transmitted data or reference signals,
- determining the sum of the data rate for said link based on the received GINRs of the frequency channels,
- determining if said target is fulfilled or a convergence metric is met, and
- repeating the previous steps of allocating, transmitting, receiving and determining and using an updated power until said target is fulfilled or said convergence metric is met.

3. The method according to claim 1, wherein said target is fulfilled if it is within a predetermined range from said target.

4. The method according to claim 1, wherein the node is a base station in the wireless communication system.

5. The method according to claim 1, wherein the node is a mobile terminal in the wireless communication system.

6. A communication node of a wireless communications system providing at least two communication links each having at least two frequency channels, wherein the communication node is configured to communicate with a receiving communication node over a link under influence of interference from surrounding transmitter(s) using said frequency channels, the communication node comprises a processor configured to determine a target for said link for the sum of the data rates, and a power allocator configured to allocate power on the frequency channels to reach said target while minimizing the sum of the power on the link;

wherein the communications node comprises a calculator configured to calculate the updated power to be allocated on one link, u, for a channel by using waterfilling allocation provided a predefined Lagrange parameter $\lambda_u^{(m+1)}$, where u represents the link and m the iteration; and wherein an updated Lagrange parameter to be used for calculating the updated power to be allocated for link u, $\lambda_u^{(m+1)}$, is $$\lambda_u^{(m+1)} = \lambda_u^{(m)} \cdot 2^{\frac{R_u^{(m)} - R_u^{Target}}{N_u^{(m)}}},$$

wherein R represents the data rate on link u at iteration m and $R_u^{Target}$ is said target and $N_u^{(m)}$ is the number of frequency channels for which the sender use non-zero transmit power in iteration m.

7. The communication node according to claim 6, wherein the communication node further comprises a transmitter for transmitting data or reference signals on the at least two links using the frequency channels of the links to a receiving communication node, a receiver for receiving an indication based on Gain-to-Interference-ratios (GINRs) of the frequency channels of the at least two links from the receiving communication node based on the transmitted data or reference signals, and the calculator configured to determine the sum of the data rate on said link based on the received GINRs of the frequency channels, configured to determine if said target is fulfilled, and configured to control that the allocation of the power is repeated using an updated power until said target is fulfilled.

8. The communication node according to claim 6, wherein said target is fulfilled if it is within a predetermined range from said target.

9. The communication node according to claim 6, wherein the node is a base station in the wireless communication system.

10. The communication node according to claim 6, wherein the node is a mobile terminal in the wireless communication system.

11. A method in a communication node of a wireless communications system wherein the communication node is subject to influence of interference from surrounding transmitter(s), the wireless communication system is providing at least two communication links each having at least two frequency channels, wherein each link is defined to comprise a sender in communication with a receiver using said frequency channels, and the method comprises the steps of:
- receiving (a) data or pilot signals on the frequency channels from a sending node,
- determining (b) an indication based on Gain-to-Interference-ratios (GINRs) of the frequency channels from the received data or pilot signals, and
- sending (c) the determined indication to the sending node to be used at the sending node for allocating power on the frequency channels to reach a target for a link for the sum of the data rates while minimizing the sum of the power on the link;

wherein the updated power to be allocated on one link, u, for a frequency channel is calculated by using waterfilling allocation provided a predefined Lagrange parameter $\lambda_u^{(m+1)}$, where u represents the link and m the iteration, and wherein an updated Lagrange parameter to be used for calculating the updated power to be allocated for link u, $\lambda_u^{(m+1)}$, is $$\lambda_u^{(m+1)} = \lambda_u^{(m)} \cdot 2^{\frac{R_u^{(m)} - R_u^{Target}}{N_u^{(m)}}},$$

wherein $R_u^{(m)}$ represents the data rate on link u at iteration m, $R_u^{Target}$ is said target, and $N_u^{(m)}$ is the number of frequency channels for which the sender use non-zero transmit power in iteration m.

12. A communication node of a wireless communications system wherein the communication node is subject to influence of interference from surrounding transmitter(s), the wireless communication system is providing at least two communication links each having at least two frequency channels, wherein each link is defined to comprise a sender in communication with a receiver using said frequency channels, the node comprises a receiver operable to receive data or pilot signals on the frequency channels from a sending node, a processor for determining an indication based on Gain-to-Interference-ratios (GINRs) of the frequency channels from the received data or pilot signals, and a transmitter for sending the determined indication to the sending node to be used at the sending node for allocating power on the frequency channels to reach a target for a link for the sum of the data rates while minimizing the sum of the power on the link;

wherein the communications node comprises a calculator configured to calculate the updated power to be allocated on one link, u, for a channel by using waterfilling allocation provided a predefined Lagrange parameter $\lambda_u^{(m+1)}$, where u represents the link and m the iteration; and wherein an updated Lagrange parameter to be used for calculating the updated power to be allocated for link u, $\lambda_u^{(m+1)}$, is $$\lambda_u^{(m+1)} = \lambda_u^{(m)} \cdot 2^{\frac{R_u^{(m)} - R_u^{Target}}{N_u^{(m)}}},$$

wherein R represents the data rate on link u at iteration m and $R_u^{Target}$ is said target and $N_u^{(m)}$ is the number of frequency channels for which the sender use non-zero transmit power in iteration m.

\* \* \* \* \*